Nov. 29, 1949     D. C. PULLIAM     2,489,500
ELECTRICAL COOKING OR TOASTING APPLIANCE
Filed May 20, 1947
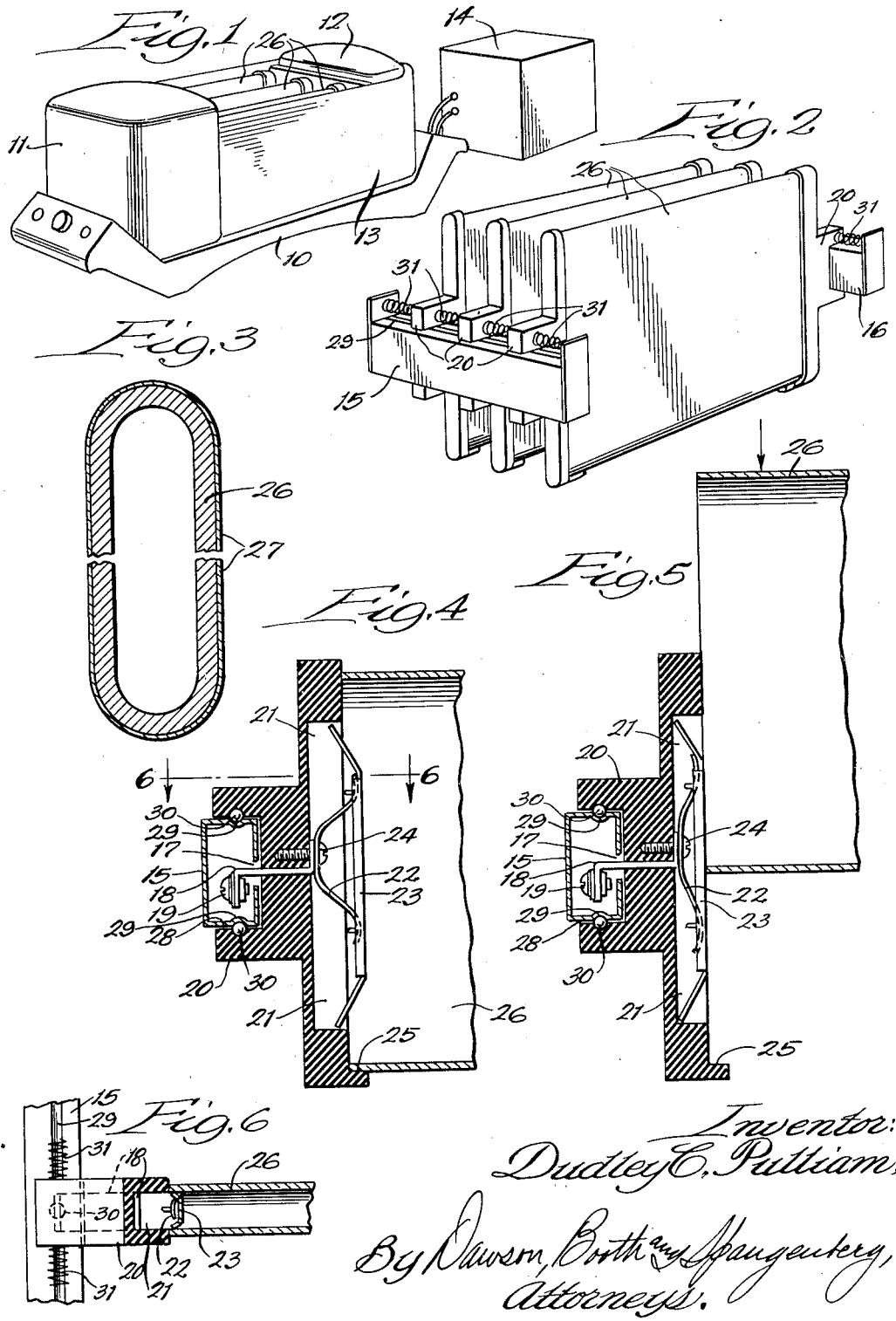

Patented Nov. 29, 1949

2,489,500

UNITED STATES PATENT OFFICE 2,489,500

ELECTRICAL COOKING OR TOASTING APPLIANCE

Dudley C. Pulliam, Chicago, Ill.

Application May 20, 1947, Serial No. 749,175

4 Claims. (Cl. 201—73)

This invention relates to a cooking or toasting appliance. The invention is useful in connection with a bread toasting appliance, a waffle iron and other similar devices. For the purpose of simplicity and clearness, the invention will be described herein in connection with a toaster.

An object of the invention is to provide a cooking or toasting appliance in which a filament or heating sheet forms substantially the inner wall or partition of the cooking or toasting compartment. A further object is to provide a structure of the type described in which radio frequency electric current is employed in the heating of the elements. Yet another object is to provide an improved toaster or cooking structure in which the effective heating elements are supported and utilized in a novel manner. Other specific objects and advantages will appear as the specification proceeds.

The invention is illustrated, in a single embodiment, by the accompanying drawing, in which—

Fig. 1 is a perspective view of apparatus embodying my invention; Fig. 2, a perspective view of the heating elements employed and the supporting structure therefor; Fig. 3, a broken transverse sectional detail view of one of the heating elements; Fig. 4, a broken enlarged sectional view of a heating element and the supporting structure therefor; Fig. 5, a view similar to Fig. 4, but showing the heating element partially removed; and Fig. 6, a broken detail sectional view, the section being taken as indicated at line 6 of Fig. 4.

In the illustration given, 10 designates a base adapted to receive the electrical conduits employed and providing switches, etc., for the operation of the toaster. The numeral 11 designates a casing member enclosing one end of the heating unit structure, and the numeral 12 designates the casing for the opposite end. The numeral 13 designates a sheath or outside casing enclosing the structure 12 and having one end received within the end casing 11. The structures 11, 12 and 13 may be formed of metal or any other suitable material.

A radio frequency generator is indicated by the numeral 14. Since the generator is of well known construction, a detailed description of its parts need not be set out herein. The generator 14 may be provided as a separate unit as indicated or, if desired, it may be housed within the casing 11. The particular radio-frequency of the energy generated by generator 14 may have any desired value, as will be more fully stated hereinafter, the design details of the heating elements in my cooking or toasting appliance will depend to some extent on the frequency chosen.

Within the structure provided by members 11, 12 and 13 are the supporting track members 15 and 16. These members may be secured by welding or by any other suitable means to the casing member 13 or to the other parts 11 and 12. The track members 15 and 16 are substantially identical, and it will therefore be sufficient to describe one of them. The track member 15, as shown more clearly in Figs. 2 and 4, comprises a rectangular body apertured at 17 to receive the conductor 18. Within the track member 15 is supported the electrical connection 19 leading from the radio frequency generator 14.

Mounted upon the track member 15 is a frame support 20 formed of plastic or any other suitable material. The member 20 is provided with a recess 21 receiving the spring member 22 and the terminal strip 23 supported by spring 22. A screw 24 secures the spring 22 against the inner flattened end of the conductor 18. The member 20 is provided at its lower side with a curved seat portion 25 receiving the lower end of the filament or heating plate 26.

The element 26 is in the form of an elongated or flattened loop. It is formed of metal and is covered on its outer surface with an electrical insulating material 27. Enamel may be used to cover the outer surface of the member 26. If the frequency of the energy supplied by generator 14 is high—above about 250 kc. per second—the thickness of the metal layers of the element 26 is not critical, since the current will flow only in a thin surface layer in any case. If the frequency be low, the metal of element 26 should be thin, so as to provide substantial electrical resistance to low-frequency current.

In the illustration given, there are three of the heating elements 26 supported within the toaster. Each of the elements rests upon the seat 25 of the support 20 and is secured between 2 oppositely disposed supports 20, as shown more clearly in Fig. 2.

The supports 20 have outwardly extending side flanges which are provided with lateral slots 28 which receive the track members 15. If desired, the track members 15 may be provided with indentations 29 adapted to engage balls 30 carried within recesses of the member 20 so as to releasably lock the members 20 in spaced relation upon the track members 15 and 16. In addition, I provide springs 31 within the elements 26 to maintain elements 26 in spaced relation while at the same time permitting a lateral movement thereof, as when large pieces of bread are placed between certain of the elements.

Operation

In the operation of the device, bread or other material to be toasted is placed between the elements 26, and switches are turned to cause radio frequency electric current to pass through the connection 19 to the conductor 18 and thence through spring 22 to the terminal 23. Current from the extensive terminal plate 23 flows along the inner side wall of each element 26 to the opposite terminal 23. The movement of the high frequency current along the inner face of the element 26 induces a current flow in the body of the member 26 generating heat therein by reason of the resistance encountered. Flow of current along the exterior surface of the member 26 is prevented by the non conducting layer 27. At the same time, the layer 27, while preventing the flow of current, allows the transfer of heat from the body 26 to the bread or other material to be toasted.

The elements 26 are normally maintained in a desired spaced relation by the balls 30 and depressions 29, but further adjustment of the members is permitted, if desired, by the springs 31. The springs permit a yielding of one of the elements 26 with respect to another to accommodate an unusually large slice of bread or other object.

It will be understood that instead of using the flattened tube structure 26, 2 separate plates may be employed which are preferably set apart with insulation therebetween and current is passed along the inner surfaces of the plates, the outer surfaces thereof being covered with an electrical insulating material 27.

If one of the heating elements 26 becomes defective and it is desired to remove the same, the element may simply be drawn upwardly as indicated in Fig. 5 to withdraw it and a new element may be substituted. The new element is pressed downwardly, as shown in Fig. 5, so as to compress the spring 22. When the lower end of the element 26 reaches its lower position, the terminal 23 moves inwardly to the position illustrated in Fig. 4, thus serving not only as a means for directing radio frequency current along the inner walls of the member 26, but also as a releasable element for locking the member 26 in position.

In conjunction with the toaster illustrated, it will be understood that any suitable "pop up" mechanism may be employed for lifting toast after it has been heated for the desired length of time. It will also be understood that other devices that are now commonly employed with toasters may be readily used in the structure shown.

With the construction illustrated, an accurate heating is obtained in a minimum of time while at the same time providing a smooth heating surface against which the slices of bread may be placed. The structure eliminates the wire coils heretofore used as resistance elements and which serve as a means for catching crumbs, etc., and cindering them. In the present structure, the heating element provides no crevice into which a crumb may fall and only the smooth exterior surface 27 contacts the bread.

Since heat is not desired for the outermost side of the outside elements 26, such outermost sides may be formed of nonconducting material or the contact element 22 may be insulated or otherwise arranged so as to pass current only along the inner side wall of the outside elements 26.

The strip 23 is preferably provided with resilient ends so as to form a good contact even though the walls of member 26 vary in contour and as to the spacing between them.

It will be observed that the heating element which is herein set out for use with an electric toaster may be just as effectively employed in a waffle iron or in other cooking appliances.

While in the illustration given, I have set forth certain structure in great detail for the purpose of illustrating an embodiment of the invention, it will be understood that the details of such structure may be widely varied by those skilled in the art without departing from the spirit of my invention.

Moreover, it will be understood that while the embodiment of my invention shown herein is intended particularly for use with radio-frequency current, the novel structural features of my invention are equally applicable to and useful in cooking apparatus intended for operation with conventional current. Therefore, I do not wish, except as specifically provided in the appended claims, to limit the scope of my invention to any particular type of current.

I claim:

1. In a cooking appliance, a plurality of electrical heating elements, a pair of elongated track members mounted in parallel relationship, friction means supporting the heating elements between the track members in substantially parallel relationship, said friction means being operative to permit said heating elements to slide along the track members, resilient means connected between the respectively adjacent heating elements to maintain them in a spaced relation while permitting relative movement therebetween along the track members, and means for connecting a source of electrical current to the heating elements.

2. In a cooking appliance, a plurality of electrical heating elements of substantially flat sheet contour, a pair of elongated track members mounted in parallel relationship, friction means supporting the heating elements between the track members in substantially parallel relationship, said friction means being operative to permit said heating elements to slide along the track members, resilient means connected between the respectively adjacent heating elements to maintain them in a spaced relation while permitting relative movement therebetween along the track members, and means for connecting a source of electrical current to the heating elements.

3. In a cooking appliance, a plurality of electrical heating elements, a pair of elongated track members mounted in parallel relationship, friction means supporting the heating elements between the track members in substantially parallel relationship, said friction means being operative to permit said heating elements to slide along the track members, resilient means connected between the respectively adjacent heating elements to maintain them in a spaced relation while permitting relative movement therebetween along the track members, and means for connecting a source of radio-frequency current to the heating elements.

4. In a cooking appliance, a plurality of electrical heating elements, each of which comprises a substantially flat metallic sheet covered with a thin layer of electrical insulating material, a pair of elongated track members mounted in parallel relationship, friction means supporting the heating elements between the track members in substantially parallel relationship, said friction means being operative to permit said heating elements to slide along the track members, resilient means connected between the respectively adjacent heating elements to maintain them in a spaced relation while permitting relative movement therebetween along the track members, and means for connecting a source of electrical current to the heating elements.

DUDLEY C. PULLIAM.

REFERENCES CITED

The following references are of record in the file of this patent:

UNITED STATES PATENTS

| Number | Name | Date |
| --- | --- | --- |
| 423,223 | Dewey | Mar. 11, 1890 |
| 760,076 | Leonard | May 17, 1904 |
| 768,764 | Leonard | Aug. 30, 1904 |
| 1,134,886 | Merrill | Apr. 6, 1915 |
| 2,277,912 | Johnson et al. | Mar. 31, 1942 |
| 2,413,003 | Sherman | Dec. 24, 1946 |